US012647480B2

(12) United States Patent
Morano

(10) Patent No.: US 12,647,480 B2
(45) Date of Patent: Jun. 2, 2026

(54) MOUNTING PERSISTENT DATA VOLUMES IN MULTIPLE BUNDLE APPLICATIONS

(71) Applicant: Rakuten Symphony, Inc., Tokyo (JP)

(72) Inventor: Thomas Jay Morano, Scotts Valley, CA (US)

(73) Assignee: Rakuten Symphony, Inc., Tokyo (JP)

( * ) Notice: Subject to any disclaimer, the term of this patent is extended or adjusted under 35 U.S.C. 154(b) by 0 days.

(21) Appl. No.: 18/245,480

(22) PCT Filed: Nov. 10, 2022

(86) PCT No.: PCT/US2022/049554
§ 371 (c)(1),
(2) Date: Mar. 15, 2023

(87) PCT Pub. No.: WO2024/102132
PCT Pub. Date: May 16, 2024

(65) Prior Publication Data
US 2025/0267192 A1      Aug. 21, 2025

(51) Int. Cl.
*H04L 67/1097*      (2022.01)
*G06F 9/54*      (2006.01)
*G06F 21/62*      (2013.01)

(52) U.S. Cl.
CPC .......... *H04L 67/1097* (2013.01); *G06F 9/547* (2013.01); *G06F 21/6218* (2013.01)

(58) Field of Classification Search
CPC ... H04L 67/1097; G06F 9/547; G06F 21/6218
See application file for complete search history.

(56) References Cited

U.S. PATENT DOCUMENTS

| | | | |
|---|---|---|---|
| 8,694,549 B2 | 4/2014 | Bumgarner | |
| 9,678,683 B1 | 6/2017 | Chen | |
| 10,055,352 B2 | 8/2018 | Wei | |
| 10,191,813 B2 | 1/2019 | Fan | |
| 10,282,231 B1 | 5/2019 | Sivasubramanian | |
| 10,338,966 B2 | 7/2019 | Chen | |
| 10,601,917 B2 | 3/2020 | Chirammal | |
| 10,901,954 B2 | 1/2021 | Ma | |
| 11,243,825 B2 | 2/2022 | Jobi | |
| 2013/0086585 A1 | 4/2013 | Huang et al. | |
| 2019/0163388 A1* | 5/2019 | Chen ................... | G06F 9/45558 |
| 2019/0213081 A1* | 7/2019 | Alluboyina ......... | G06F 11/1464 |

(Continued)

FOREIGN PATENT DOCUMENTS

| | | |
|---|---|---|
| CN | 108681434 A | 10/2018 |
| CN | 111966305 B | 2/2021 |
| EP | 3657358 A1 | 5/2021 |

*Primary Examiner* — Viet D Vu
(74) *Attorney, Agent, or Firm* — David R. Stevens; Stevens Law Group

(57) ABSTRACT

Systems and methods for mapping users and applications to persistent data volumes. A method includes identifying an application bundle comprising a role, wherein the role is mapped to a pod comprising one or more containers. The method includes generating a persistent data volume referenced by the application bundle, wherein the persistent data volume is created independent of the application bundle. The method includes generating a persistent volume claim for the persistent data volume and mounting the persistent data volume to one or more of the pod or at least one of the one or more containers.

18 Claims, 14 Drawing Sheets

100

(56) References Cited

U.S. PATENT DOCUMENTS

| | | |
|---|---|---|
| 2020/0310915 A1 | 10/2020 | Alluboyina et al. |
| 2021/0263802 A1 | 8/2021 | Gottemukkula et al. |
| 2022/0091866 A1* | 3/2022 | Godowski ............. G06F 3/0631 |
| 2023/0090190 A1* | 3/2023 | Iila ..................... H04L 63/0876 |
| | | 726/1 |

* cited by examiner

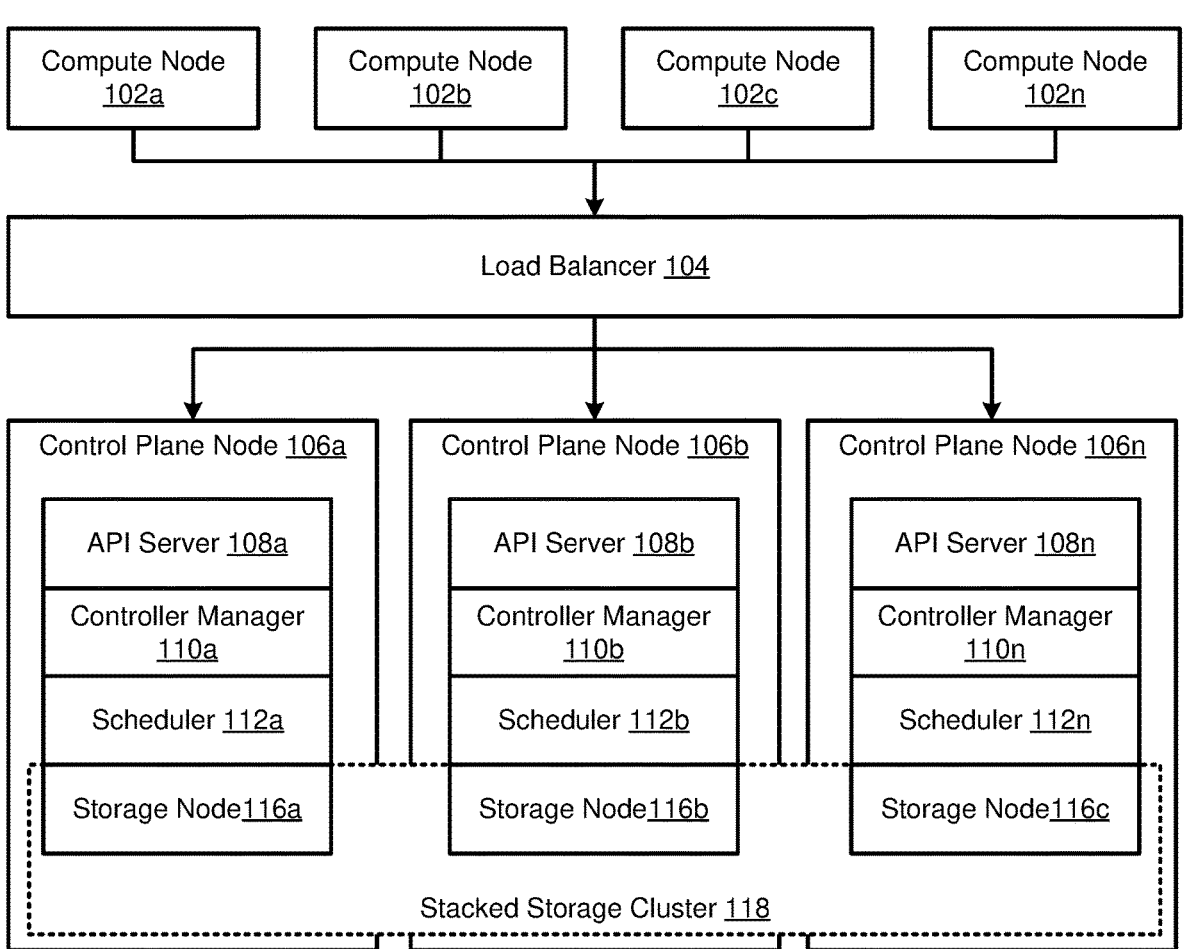
FIG. 1B

300

| Container 308a | Container 308b | Container 308n |
|---|---|---|
| Application 310a | Application 310b | Application 310n |
| Library 312a | Library 312b | Library 312n |

Container Runtime
306

Operating System
304

Hardware
302

400

| Storage Node 116 | Storage Node 116 | Compute Node 102 | Compute Node 102 |

Storage Manager 402

Orchestration Layer 404

Application Bundle 406

| Manifest 408 | Provisioning 410 | Configuration Parameters/ Functions 412 | Action Hooks 414 |

Role 416

Provisioning Constraints 418

Namespace 420

Configuration Parameters 422

Pod 424

Container 308

Management <u>806</u>

Persistent Data Volume (PDV) <u>712</u>

Tenant <u>802</u>

User <u>804</u>

Deployment System <u>808</u>

Persistent Volume Claim (PVC) <u>814</u>

Persistent Volume (PV) <u>816</u>

Storage Provider <u>820</u>

Volume <u>710</u>

Disk <u>818</u>

Disk <u>818</u>

Disk <u>818</u>

```
apiVersion: v1
Kind: Pod
Metadata:
     name: busybox
     namespace: t002-u000007
Spec:
     volumes:
     name: pdv
     persistentVolumeClaim:
     claimName: pvc-2-7-16648189514775
Containers:
     image: busybox
     command:
     sleep
     "3600"
imagePullPolicy: IfNotPresent
     name: busybox
     volumeMounts:
     mountPath: /mnt/pdv
     name: pdv
restartPolicy: Always
```

FIG. 9

```
"pdvs": [
    {
        "name": "pdv-657621a5-300e-4f7f-886a-090d2a11ed9d3",
        "mount_path": "/mnt/pdv"
    }
],
```

FIG. 10

1100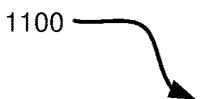

Generating A Persistent Data Volume To Be Accessed By An Application Bundle, Wherein The Persistent Data Volume Is Created Independent Of The Application Bundle. 1102

Identifying The Application Bundle, Wherein The Application Bundle Comprises One Or More Roles, And Wherein Each Of The One Or More Roles Is Mapped To A Pod Comprising One Or More Containers. 1104

Generating A Persistent Volume Claim For The Persistent Data Volume. 1106

Mounting The Persistent Data Volume To At Least One Of The Pods Or The Containers Associated With At Least One Of The One Or More Roles Of The Application Bundle. 1108

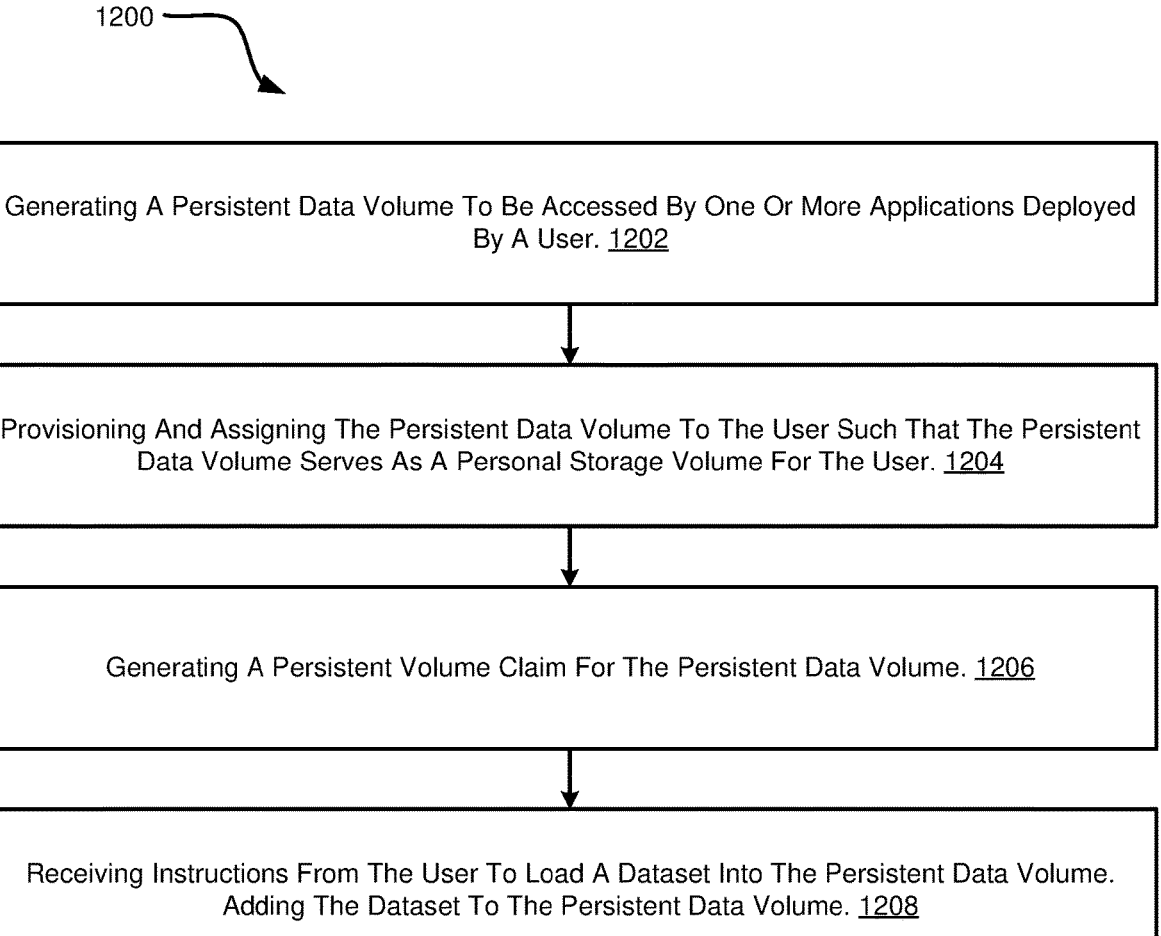

Generating A Persistent Data Volume To Be Accessed By One Or More Applications Deployed By A User. 1202

Provisioning And Assigning The Persistent Data Volume To The User Such That The Persistent Data Volume Serves As A Personal Storage Volume For The User. 1204

Generating A Persistent Volume Claim For The Persistent Data Volume. 1206

Receiving Instructions From The User To Load A Dataset Into The Persistent Data Volume. Adding The Dataset To The Persistent Data Volume. 1208

Mounting The Persistent Data Volume To One Or More Applications Deployed By The User In Response To Determining That The One Or More Applications Process The Dataset. 1210

FIG. 12

MOUNTING PERSISTENT DATA VOLUMES IN MULTIPLE BUNDLE APPLICATIONS

TECHNICAL FIELD

This disclosure relates generally to provisioning resources in a cloud computing environment, and specifically relates to mounting a persistent data volume to an application executed by one or more compute nodes.

SUMMARY

Systems and methods for mapping users and applications to persistent data volumes. A method includes identifying an application bundle to be executed by one or more compute nodes. The method includes generating a persistent data volume referenced by the application bundle, wherein the persistent data volume is created independent of the application bundle. The method includes mounting the persistent data volume to one or more containers associated with the application bundle. The method includes generating a persistent volume claim for the persistent data volume, wherein the persistent volume claim indicates that the persistent data volume will be retained after a final bundle application referencing the persistent data volume is terminated.

BACKGROUND

Numerous industries benefit from and rely upon cloud-based computing resources to store data, access data, and run applications based on the stored data. In some cases, these industries require that some information be "persistent," or that the information is stored and maintained even when the information is not being used by an application. Some cloud-based computing systems, including Kubernetes® provide support for shared persistent storage volumes that can be mounted by multiple containers in a single application, or by containers in multiple applications.

However, in traditional systems, deploying applications that mount shared persistent volumes requires manual instrumentation. Each shared data volume must be manually provisioned and added to the specification of each application that will be mounting it. Additionally, in traditional systems, shared persistent data volumes cannot be referenced by application bundles, nor mounted to bundle application containers. This occurs because the life cycle of the application bundle volume is the same as the lifecycle of the application bundle itself. Thus, the associated data volumes are created when an application is deployed, and then the associated data volumes are destroyed when the application is deleted. Shared persistent data volumes, on the other hand, have their own lifecycle. These persistent data volumes must already exist prior to an application being deployed and must not be destroyed when the application is deleted.

In traditional systems, there are no means to map a user to a shared persistent data volume. Additionally, there is no means to map a user to an application associated with that user. These traditional systems further fail to enable users to map a shared persistent data volume to an application bundle that defines one or more roles for an application.

In view of the foregoing, disclosed herein are systems, methods, and devices for creating persistent data volumes, binding persistent data volumes to users, and mounting persistent data volumes in bundle application containers.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 1B is a schematic block diagram of a system for automated deployment, scaling, and management of containerized workloads and services, wherein the system draws on storage within a stacked storage cluster;

FIG. 9 is a block depicting an example means for mounting a persistent data volume to a pod of an application;

FIG. 10 is a block depicting an example means for mounting a persistent data volume to an application bundle;

FIG. 11 is a schematic flow chart diagram of a method for mounting a persistent data volume to an application bundle;

FIG. 12 is a schematic flow chart diagram of a method for binding a persistent data volume to a user.

DETAILED DESCRIPTION

Figure 1A:
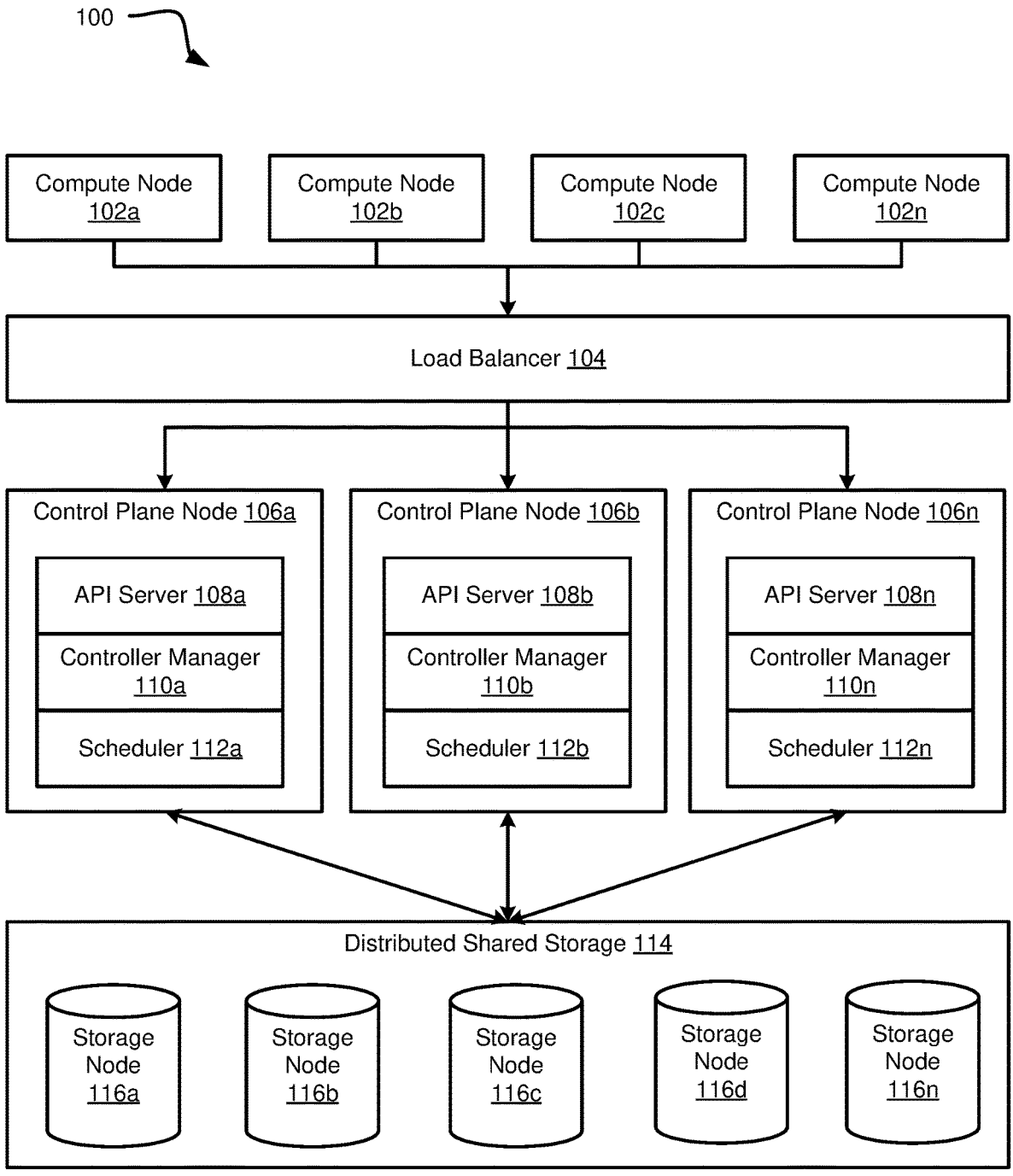
FIG. 1A is a schematic block diagram of a system for automated deployment, scaling, and management of containerized workloads and services, wherein the system draws on storage distributed across shared storage resources.

Disclosed herein are systems, methods, and devices for managing and implementing persistent data volumes that can be mounted by multiple containers. The multiple containers may each service a single application or multiple different applications and may still draw on the shared persistent storage resources described herein. The persistent data volumes described herein are implemented in a system that manages containerized workloads and services.

In traditional implementations, if an application is deleted, then the associated data volumes are also deleted along with the application. The systems, methods and devices described herein address this deficiency by mounting persistent data volumes to multiple applications, such that the persistent data volumes have a lifespan independent of each individual application. Further described herein are systems, methods, and devices for mounting a persistent data volume to an application bundle comprising a manifest.

A method described herein includes identifying an application bundle to be executed by one or more compute nodes. The application bundle comprises one or more roles that are each mapped to a pod comprising one or more containers. The method includes generating a persistent data volume referenced by the application bundle, wherein the persistent data volume is created independent of the application bundle. The method includes mounting the persistent data volume to at least one of the one or more roles of the application bundle. The method includes causing the application bundle to reference the persistent data volume. The method includes generating a persistent volume claim for the persistent data volume, wherein the persistent volume claim indicates that the persistent data volume will be retained after a final bundle application referencing the persistent data volume is terminated.

The persistent data volumes described herein simplify the use of shared persistent data volumes when deploying multiple applications within a resource cluster. These persistent data volumes provide a streamline mechanism for adding shared volumes of information to the application specification.

Additionally, the systems, methods, and devices described herein enable a persistent data volume to be provisioned and assigned to a user. In these cases, the persistent data volume essentially becomes that user's personal storage volume. For example, the user can load a standard dataset into the persistent data volume and then mount the persistent data volume within multiple applications that process the data in their pipelines. The persistent data volume is provisioned and assigned to a user independent of any application or bundle application. Normally, when a persistent volume claim is created, there is no persistent volume bound to it until the persistent volume claim is mounted in a pod or container. With a persistent data volume, the persistent volume claim is created with the volume binding mode set to Immediate. This results in a persistent volume and volume being allocated immediately. The reclaim policy is set to Retain, which prevents the underlying persistent volume from being removed automatically when the persistent volume claim is no longer referenced. The persistent data volume construct contains a reference to the assigned user and the tenant the namespace is mapped to. In order for a user to add a persistent data volume to the manifest for an application bundle, the user must have permission to use the persistent data volume, i.e., the user must be the owner of the persistent data volume, or the persistent data volume must have been shared with the user.

Referring now to the figures, FIGS. 1A and 1B are schematic illustrations of an example system 100 for automated deployment, scaling, and management of containerized workloads and services. The system 100 facilitates declarative configuration and automation through a distributed platform that orchestrates different compute nodes that may be controlled by central master nodes. The system 100 may include "n" number of compute nodes that can be distributed to handle pods.

The system 100 includes a plurality of compute nodes 102a, 102b, 102c, 102n (may collectively be referred to as compute nodes 102 as discussed herein) that are managed by a load balancer 104. The load balancer 104 assigns processing resources from the compute nodes 102 to one or more of the control plane nodes 106a, 106b, 106n (may collectively be referred to as control plane nodes 106 as discussed herein) based on need. In the example implementation illustrated in FIG. 1A, the control plane nodes 106 draw upon a distributed shared storage 114 resource comprising a plurality of storage nodes 116a, 116b 116c, 116d, 116n (may collectively be referred to as storage nodes 116 as discussed herein). In the example implementation illustrated in FIG. 1B, the control plane nodes 106 draw upon assigned storage nodes 116 within a stacked storage cluster 118.

The control planes 106 make global decisions about each cluster and detect and responds to cluster events, such as initiating a pod when a deployment replica field is unsatisfied. The control plane node 106 components may be run on any machine within a cluster. Each of the control plane nodes 106 includes an API server 108, a controller manager 110, and a scheduler 112.

The API server 108 functions as the front end of the control plane node 106 and exposes an Application Program Interface (API) to access the control plane node 106 and the compute and storage resources managed by the control plane node 106. The API server 108 communicates with the storage nodes 116 spread across different clusters. The API server 108 may be configured to scale horizontally, such that it scales by deploying additional instances. Multiple instances of the API server 108 may be run to balance traffic between those instances.

The controller manager 110 embeds core control loops associated with the system 100. The controller manager 110 watches the shared state of a cluster through the API server 108 and makes changes attempting to move the current state of the cluster toward a desired state. The controller manager 110 may manage one or more of a replication controller, endpoint controller, namespace controller, or service accounts controller.

The scheduler 112 watches for newly created pods without an assigned node, and then selects a node for those pods to run on. The scheduler 112 accounts for individual and collective resource requirements, hardware constraints, software constraints, policy constraints, affinity specifications, anti-affinity specifications, data locality, inter-workload interference, and deadlines.

The storage nodes 116 function as a distributed storage resources with backend service discovery and database. The storage nodes 116 may be distributed across different physical or virtual machines. The storage nodes 116 monitor changes in clusters and store state and configuration data that may be accessed by a control plane node 106 or a cluster. The storage nodes 116 allow the system 100 to support discovery service so that deployed applications can declare their availability for inclusion in service.

In some implementations, the storage nodes 116 are organized according to a key-value store configuration, although the system 100 is not limited to this configuration. The storage nodes 116 may create a database page for each record such that the database pages do not hamper other records while updating one. The storage nodes 116 may collectively maintain two or more copies of data stored across all clusters on distributed machines.

Figure 2:
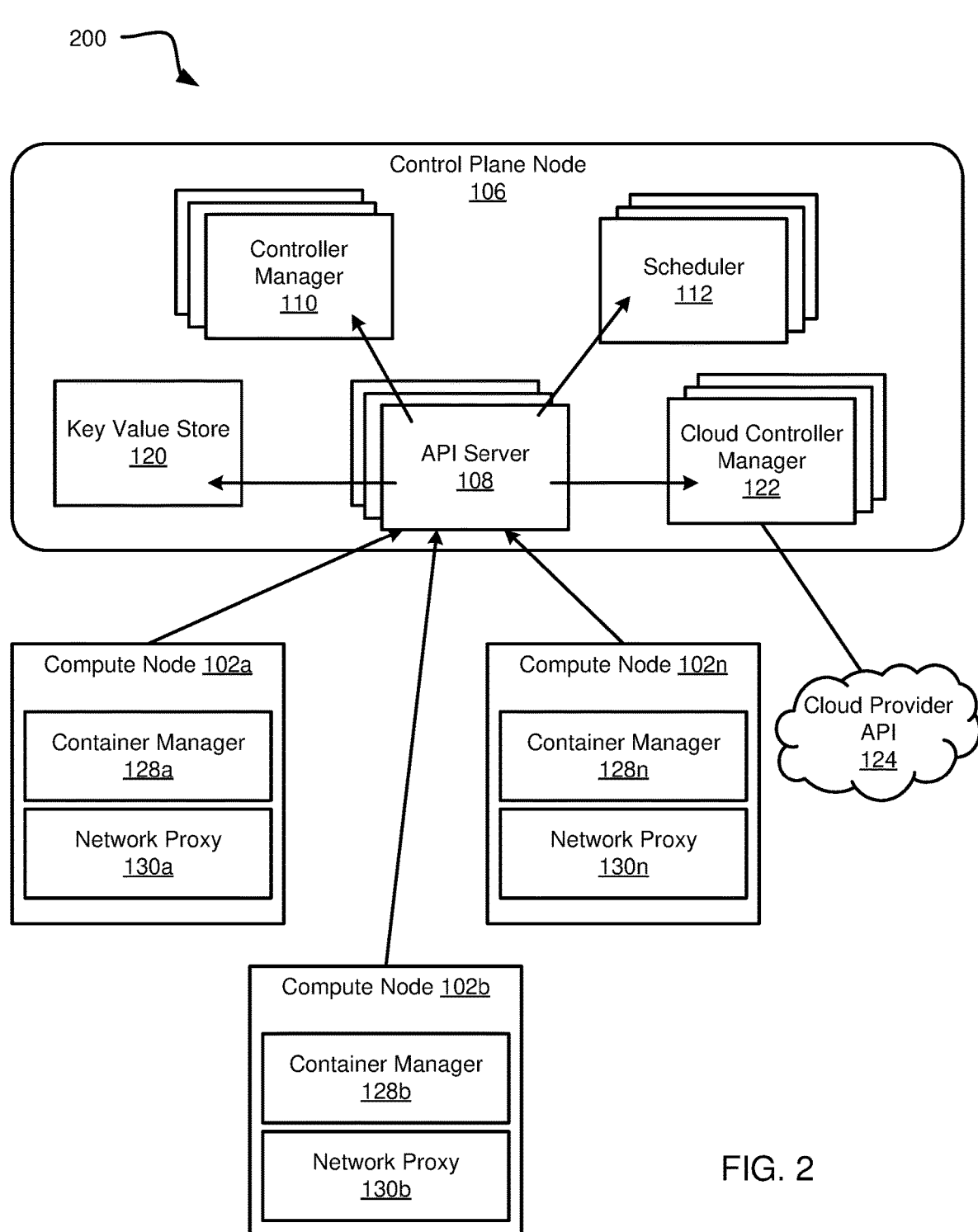
FIG. 2 is a schematic block diagram of a system for automated deployment, scaling, and management of containerized applications.

FIG. 2 is a schematic illustration of a cluster 200 for automating deployment, scaling, and management of containerized applications. The cluster 200 illustrated in FIG. 2 is implemented within the systems 100 illustrated in FIGS. 1A-1B, such that the control plane node 106 communicates with compute nodes 102 and storage nodes 116 as shown in FIGS. 1A-1B. The cluster 200 groups containers that make up an application into logical units for management and discovery.

The cluster 200 deploys a cluster of worker machines, identified as compute nodes 102a, 102b, 102n. The compute nodes 102a-102n run containerized applications, and each cluster has at least one node. The compute nodes 102a-102n host pods that are components of an application workload. The compute nodes 102a-102n may be implemented as virtual or physical machines, depending on the cluster. The cluster 200 includes a control plane node 106 that manages compute nodes 102a-102n and pods within a cluster. In a production environment, the control plane node 106 typically manages multiple computers and a cluster runs multiple nodes. This provides fault tolerance and high availability.

The key value store 120 is a consistent and available key value store used as a backing store for cluster data. The controller manager 110 manages and runs controller processes. Logically, each controller is a separate process, but to reduce complexity in the cluster 200, all controller processes are compiled into a single binary and run in a single process. The controller manager 110 may include one or more of a node controller, job controller, endpoint slice controller, or service account controller.

The cloud controller manager 122 embeds cloud-specific control logic. The cloud controller manager 122 enables clustering into a cloud provider API 124 and separates components that interact with the cloud platform from components that only interact with the cluster. The cloud controller manager 122 may combine several logically independent control loops into a single binary that runs as a single process. The cloud controller manager 122 may be scaled horizontally to improve performance or help tolerate failures.

The control plane node 106 manages any number of compute nodes 126. In the example implementation illustrated in FIG. 2, the control plane node 106 is managing three nodes, including a first node 126a, a second node 126b, and an nth node 126n (which may collectively be referred to as compute nodes 126 as discussed herein). The compute nodes 126 each include a container manager 128 and a network proxy 130.

The container manager 128 is an agent that runs on each compute node 126 within the cluster managed by the control plane node 106. The container manager 128 ensures that containers are running in a pod. The container manager 128 may take a set of specifications for the pod that are provided through various mechanisms, and then ensure those specifications are running and healthy.

The network proxy 130 runs on each compute node 126 within the cluster managed by the control plane node 106. The network proxy 130 maintains network rules on the compute nodes 126 and allows network communication to the pods from network sessions inside or outside the cluster.

Figure 3:
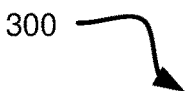
FIG. 3 is a schematic block diagram illustrating a system for managing containerized workloads and services.

FIG. 3 is a schematic diagram illustrating a system 300 for managing containerized workloads and services. The system 300 includes hardware 302 that supports an operating system 304 and further includes a container runtime 306, which refers to the software responsible for running containers 308. The hardware 302 provides processing and storage resources for a plurality of containers 308a, 308b, 308n that each run an application 310 based on a library 312. The system 300 discussed in connection with FIG. 3 is implemented within the systems 100, 200 described in connection with FIGS. 1A-1B and 2.

The containers 308 function similar to a virtual machine but have relaxed isolation properties and share an operating system 304 across multiple applications 310. Therefore, the containers 308 are considered lightweight. Similar to a virtual machine, a container has its own file systems, share of CPU, memory, process space, and so forth. The containers 308 are decoupled from the underlying instruction and are portable across clouds and operating system distributions.

Containers 308 are repeatable and may decouple applications from underlying host infrastructure. This makes deployment easier in different cloud or OS environments. A container image is a ready-to-run software package, containing everything needed to run an application, including the code and any runtime it requires, application and system libraries, and default values for essential settings. By design, a container 308 is immutable such that the code of a container 308 cannot be changed after the container 308 begins running.

The containers 308 enable certain benefits within the system. Specifically, the containers 308 enable agile application creation and deployment with increased ease and efficiency of container image creation when compared to virtual machine image use. Additionally, the containers 308 enable continuous development, integration, and deployment by providing for reliable and frequent container image build and deployment with efficient rollbacks due to image immutability. The containers 308 enable separation of development and operations by creating an application container at release time rather than deployment time, thereby decoupling applications from infrastructure. The containers 308 increase observability at the operating system-level, and also regarding application health and other signals. The containers 308 enable environmental consistency across development, testing, and production, such that the applications 310 run the same on a laptop as they do in the cloud. Additionally, the containers 308 enable improved resource isolation with predictable application 310 performance. The containers 308 further enable improved resource utilization with high efficiency and density.

The containers 308 enable application-centric management and raise the level of abstraction from running an operating system 304 on virtual hardware to running an application 310 on an operating system 304 using logical resources. The containers 304 are loosely coupled, distributed, elastic, liberated micro-services. Thus, the applications 310 are broken into smaller, independent pieces and can be deployed and managed dynamically, rather than a monolithic stack running on a single-purpose machine.

The containers 308 may include any container technology known in the art such as DOCKER, LXC, LCS, KVM, or the like. In a particular application bundle 406, there may be containers 308 of multiple distinct types in order to take advantage of a particular container's capabilities to execute a particular role 416. For example, one role 416 of an application bundle 406 may execute a DOCKER container 308 and another role 416 of the same application bundle 406 may execute an LCS container 308.

The system 300 allows users to bundle and run applications 310. In a production environment, users may manage containers 308 and run the applications to ensure there is no downtime. For example, if a singular container 308 goes down, another container 308 will start. This is managed by the control plane nodes 106, which oversee scaling and failover for the applications 310.

Figure 4:
FIG. 4 is a schematic block diagram illustrating a system for implementing an application-orchestration approach to data management and allocation of processing resources.

FIG. 4 is a schematic diagram of an example system 400 implementing an application-orchestration approach to data management and the allocation of processing resources. The system 400 includes an orchestration layer 404 that implements an application bundle 406 including one or more roles 416. The role 416 may include a standalone application, such as a database, webserver, blogging application, or any other application. Examples of roles 416 include the roles used to implement multi-role applications such as CASSANDRA, HADOOP, SPARK, DRUID, SQL database, ORACLE database, MONGODB database, WORDPRESS, and the like. For example, in HADOOP, roles 416 may include one or more of a named node, data node, zookeeper, and AMBARI server.

The orchestration layer 404 implements an application bundle 406 by defining roles 416 and relationships between roles 416. The orchestration layer 404 may execute on a computing device of a distributed computing system (see, e.g., the systems illustrated in FIGS. 1A-1B and 2-3), such as on a compute node 102, storage node 116, a computing device executing the functions of the control plane node 106, or some other computing device. Accordingly, actions performed by the orchestration layer 404 may be interpreted as being performed by the computing device executing the orchestration layer 404.

The application bundle 406 includes a manifest 408 and artifacts describing an application. The application bundle 406 itself does not take any actions. When the application bundle 406 is deployed by compute resources, the application bundle 406 is then referred to as a "bundle application." This is discussed in connection with FIG. 6, which illustrates deployment of the application bundle 406 to generate a bundle application 606 comprising one or more pods 424 and containers 308 run on compute nodes 102 within a cluster 200.

The application bundle 406 includes a manifest 408 that defines the roles 416 of the application bundle 406, which may include identifiers of roles 416 and possibly a number of instances for each role 416 identified. The manifest 408 defines dynamic functions based on the number of instances of a particular role 416, which may grow or shrink in real-time based on usage. The orchestration layer 404 creates or removes instances for a role 416 as described below as indicated by usage and one or more functions for that role 416. The manifest 408 defines a topology of the application bundle 406, which includes the relationships between roles 416, such as services of a role that are accessed by another role.

The application bundle 406 includes a provisioning component 410. The provisioning component 410 defines the resources of storage nodes 116 and compute nodes 102 required to implement the application bundle 406. The provisioning component 410 defines the resources for the application bundle 406 as a whole or for individual roles 416. The resources may include a number of processors (e.g., processing cores), an amount of memory (e.g., RAM (random access memory), an amount of storage (e.g., GB (gigabytes) on an HDD (Hard Disk Drive) or SSD (Solid State Drive)), and so forth. As described below, these resources may be provisioned in a virtualized manner such that the application bundle 406 and individual roles 416 are not informed of the actual location or processing and storage resources and are relieved from any responsibility for managing such resources.

The provisioning component 410 implements static specification of resources and may also implement dynamic provisioning functions that invoke allocation of resources in response to usage of the application bundle 406. For example, as a database fills up, additional storage volumes may be allocated. As usage of an application bundle 406 increases, additional processing cores and memory may be allocated to reduce latency.

The application bundle 406 may include configuration parameters 412. The configuration parameters include variables and settings for each role 416 of the application bundle 406. The developer of the role defines the configuration parameters 416 and therefore may include any example of such parameters for any application known in the art. The configuration parameters may be dynamic or static. For example, some parameters may be dependent on resources such as an amount of memory, processing cores, or storage. Accordingly, these parameters may be defined as a function of these resources. The orchestration layer will then update such parameters according to the function in response to changes in provisioning of those resources that are inputs to the function.

The application bundle 406 may further include action hooks 414 for various life cycle actions that may be taken with respect to the application bundle 406 and/or particular roles 416 of the application bundle 406. Actions may include some or all of stopping, starting, restarting, taking snapshots, cloning, and rolling back to a prior snapshot. For each action, one or more action hooks 414 may be defined. An action hook 414 is a programmable routine that is executed by the orchestration layer 404 when the corresponding action is invoked. The action hook 414 may specify a script of commands or configuration parameters input to one or more roles 416 in a particular order. The action hooks 414 for an action may include a pre-action hook (executed prior to implementing an action), an action hook (executed to actually implement the action), and a post action hook (executed following implementation of the action).

The application bundle 406 defines one or more roles 416. Each role 416 may include one or more provisioning constraints. As noted above, the application bundle 406 and the roles 416 are not aware of the underlying storage nodes 106 and compute nodes 116 inasmuch as these are virtualized by the storage manager 402 and orchestration layer 404. Accordingly, any constraints on allocation of hardware resources may be included in the provisioning constraints 410. As described in greater detail below, this may include constraints to create separate fault domains in order to implement redundancy and constraints on latency.

The role 416 references the namespace 420 defined by the application bundle 406. All pods 424 associated with the application bundle 406 are deployed in the same namespace 420. The namespace 420 includes variables, functions, services, and the like implemented by the role 416. In particular, interfaces and services exposed by a role may be included in the namespace 420. The namespace 420 may be referenced through the orchestration layer 404 by an addressing scheme, e.g. <Bundle ID>.<Role ID>.<Name>. In some embodiments, references to the namespace 420 of another role 416 may be formatted and processed according to the JINJA template engine or some other syntax. Accordingly, each role 416 may access the variables, functions, services, etc. in the namespace 420 in order to implement a complex application topology.

A role 416 may further include various configuration parameters 422 defined by the role, i.e. as defined by the developer that created the executable for the role 416. As noted above, these parameters may be set by the orchestration layer 404 according to the static or dynamic configuration parameters 422. Configuration parameters 422 may also be referenced in the namespace 420 and be accessible (for reading and/or writing) by other roles 416.

Each role 416 within the application bundle 406 maps to a pod 424. Each of the one or more pods 424 includes one or more containers 308. Each resource allocated to the application bundle 406 is mapped to the same namespace 420.

The pods 424 are the smallest deployable units of computing that may be created and managed in the systems described herein. The pods 424 constitute groups of one or more containers 308, with shared storage and network resources, and a specification of how to run the containers 308. The pods' 502 containers are co-located and co-scheduled and run in a shared context. The pods 424 are modeled on an application-specific "logical host," i.e., the pods 424 include one or more application containers 308 that are relatively tightly coupled. In non-cloud contexts, application bundles 406 executed on the same physical or virtual machine are analogous to cloud applications executed on the same logical host.

The pods 424 are designed to support multiple cooperating processes (as containers 308) that form a cohesive unit of service. The containers 308 in a pod 424 are co-located and co-scheduled on the same physical or virtual machine in the cluster. The containers 308 can share resources and dependencies, communicate with one another, and coordinate when and how they are terminated. The pods 424 may be designed as relatively ephemeral, disposable entities. When a pod 424 is created, the new pod 424 is schedule to run on a node in the cluster. The pod 424 remains on that node until the pod 424 finishes executing, and then the pod 424 is deleted, evicted for lack of resources, or the node fails.

In some implementations, the shared context of a pod 424 is a set of Linux® namespaces, cgroups, and potentially other facets of isolation, which are the same components of a container 308. The pods 424 are similar to a set of containers 308 with shared namespaces and shared filesystem volumes.

The pods 424 can specify a set of shared storage volumes. All containers 308 in the pod 424 can access the shared volumes, which allows those containers 308 to share data. Volumes allow persistent data in a pod 424 to survive in case one of the containers 308 within needs to be restarted.

In some cases, each pod 424 is assigned a unique IP address for each address family. Every container 308 in a pod 424 shares the network namespace, including the IP address and network ports. Inside a pod 424, the containers that belong to the pod 424 can communicate with one another using localhost. When containers 308 in a pod 424 communicate with entities outside the pod 424, they must coordinate how they use the shared network resources. Within a pod 424, containers share an IP address and port space, and can find each other via localhost. The containers 308 in a pod 424 can also communicate with each other using standard inter-process communications.

Figure 5:
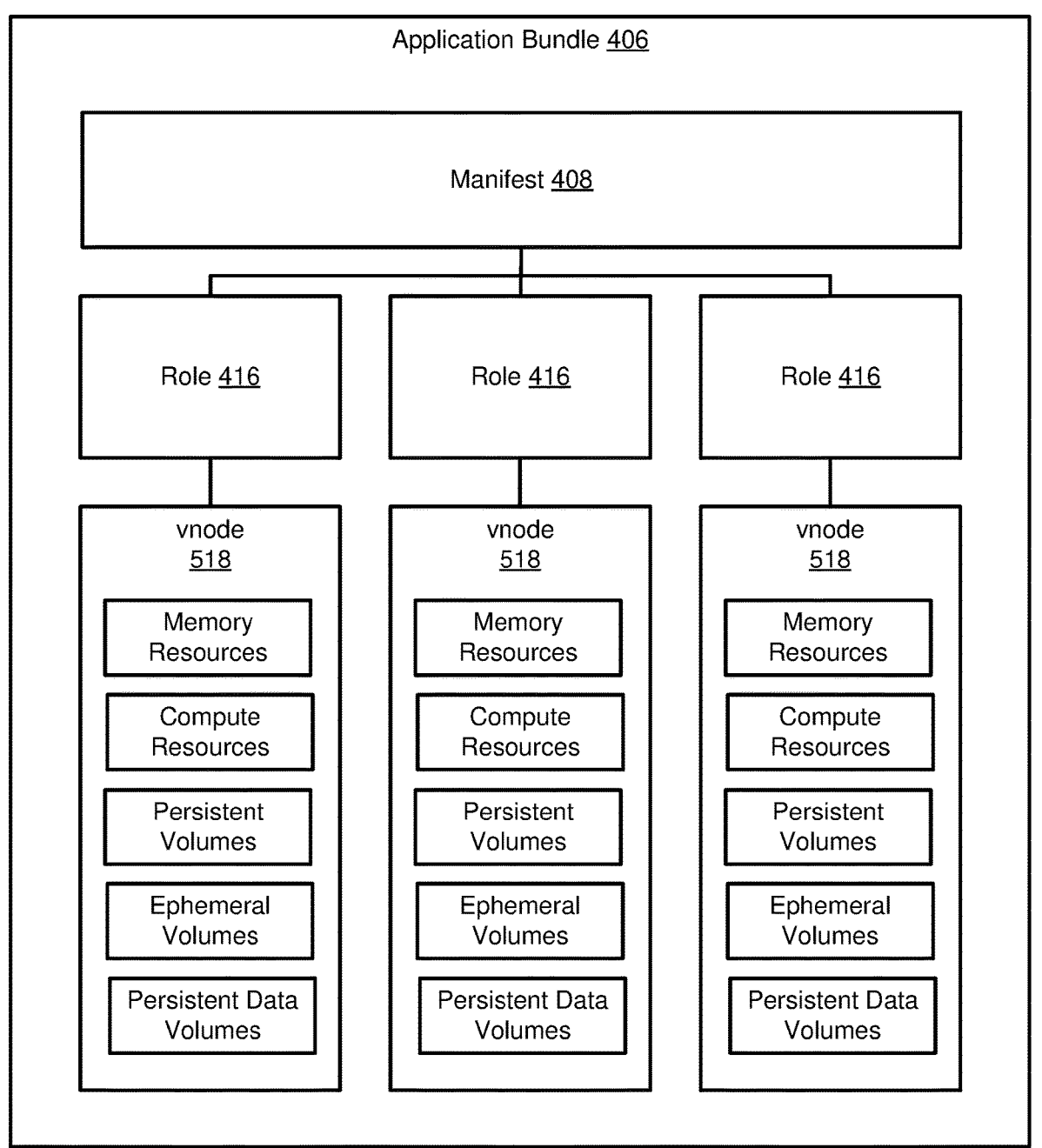
FIG. 5 is a schematic block diagram illustrating an example application bundle.

FIG. 5 is a schematic illustrations of an example application bundle 406 that may be executed by the systems described herein. The application bundle 406 is a collection of artifacts required to deploy and manage an application. The application bundle 406 includes one or more application container images referenced within a manifest 408 file that describes the components of its corresponding application bundle 406. The manifest 408 file further defines the necessary dependencies between services, resource requirements, affinity and non-affinity rules, and custom actions required for application management. As a result, a user may view the application bundle 406 as the starting point for creating an application within the systems described herein.

The application bundle 406 includes the manifest 408 file, and further optionally includes one or more of an icons directory, scripts directory, and source directory. The manifest 408 file may be implemented as a YAML file that acts as the blueprint for an application. The manifest 408 file describes the application components, dependencies, resource requirements, hookscripts, execution order, and so forth for the application. The icons directory includes application icons, and if no icon is provided, then a default image may be associated with the application bundle 406. The scripts directory includes scripts that need to be run during different stages of the application deployment. The scripts directory additionally includes lifecycle management for the application.

The example application bundle 406 illustrated in FIG. 5 includes a plurality of roles 416, but it should be appreciated that the application bundle 406 may have any number of roles 416, including one or more roles 416 as needed depending on the implementation. Each role 416 defines one or more vnodes 518. Each vnode 518 specifies container 308 resources for the corresponding role 416. The container resources include one or more of memory resources, compute resources, persistent volumes, persistent data volumes, and ephemeral data volumes. When the application bundle 406 is deployed in a cluster such as the cluster 200 illustrated in FIG. 2, each role 416 maps to a pod 424 and each vnode 518 maps to a container 308.

The manifest 408 file has several attributes that can be used to manipulate aspects of a container 308, including the compute node 102 resources and storage node 116 resources allocated to the containers 308, which containers 308 are spawned, and so forth. The application bundle 406 enables user to specify image and runtime engine options for each role 416. These options may include, for example name (name of the image), version (version of the image), and engine (type of runtime such as DOCKER, KVM, IXC, and so forth).

The manifest 408 file allocates compute resources such as memory, CPU, hugepages, GPU, and so forth, at the container 308 level. A user may specify the type of CPUs that should be picked, and may further specify options such as Non-Isolated, Isolated-Shared, and Isolated-Dedication. The Non-Isolated option indicates that the physical CPUs to be used for a deployment of the application bundle 406 should be from a non-isolated pool of CPUs on a host. The Isolated-Shared option indicates that the physical CPUs to be used for a deployment of the application bundle 406 should be from an isolated pool of CPUS on the host. With this option, even though the allocated CPUs are isolated from kernel processes, they can still be utilized by other application deployments. The Isolated-Dedicated option indicates that the physical CPUs to be used for a deployment of the application bundle 406 should be from an isolated pool of CPUs on the host. With this option, the allocated CPUs are isolated from kernel processes and other application deployments. The manifest 408 file further allocates storage resources at the container 308 level.

Figure 6:
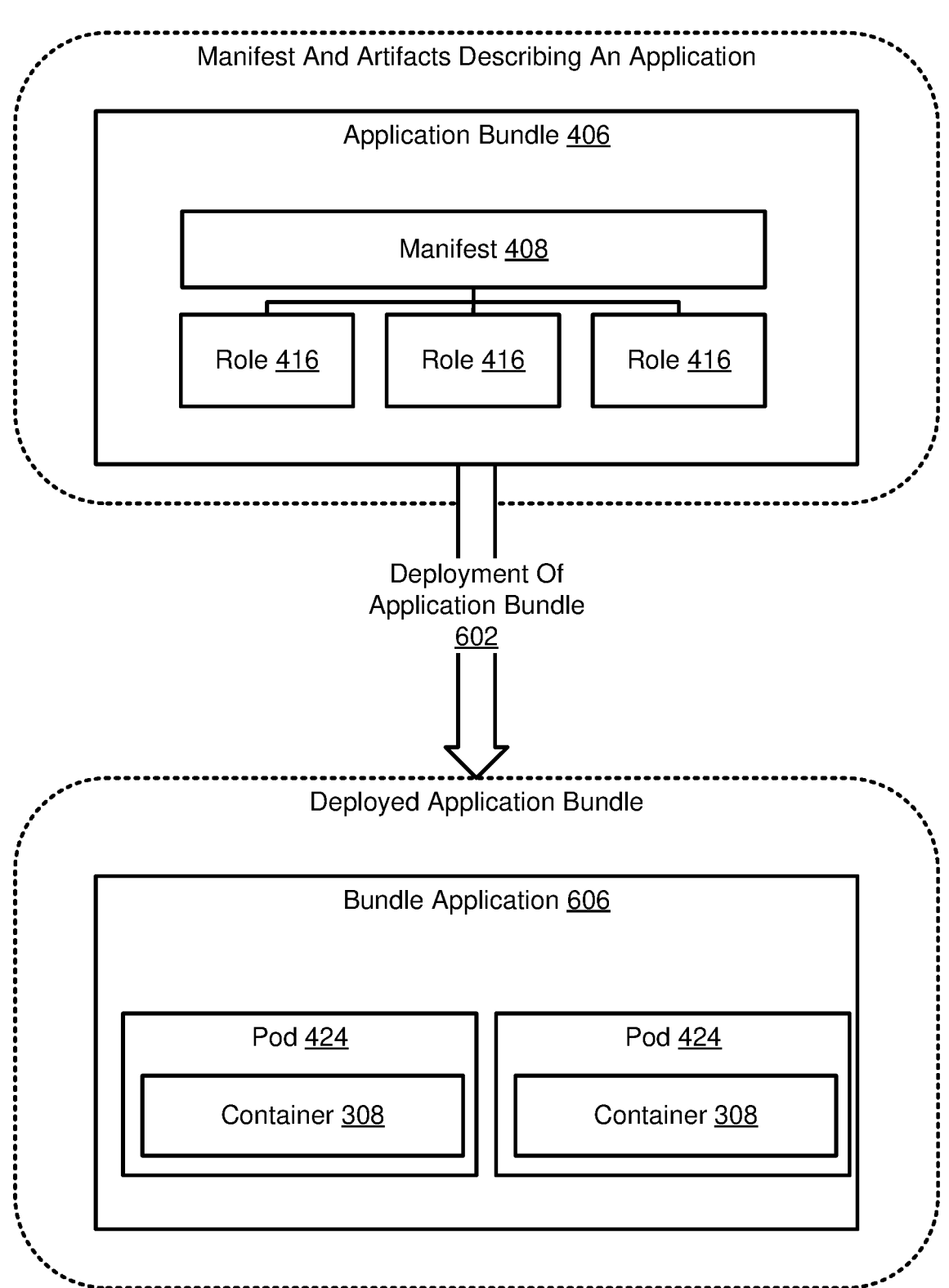
FIG. 6 is a schematic block diagram illustrating deployment of an application bundle, wherein the deployed application bundle is a bundle application including one or more pods and containers.

FIG. 6 is a schematic diagram illustrating deployment of an application bundle. As discussed herein, the application bundle 406 refers to a collection including a manifest and other artifacts describing an application. The application bundle 406 includes the manifest 408, one or more roles 416, and one or more vnodes assigned to each role 416 as described herein. The application bundle 406 may be deployed at 602 by compute nodes 102 within a cluster 200. As discussed herein, the deployed application bundle 406 is referred to as a bundle application 606. The bundle application 606 includes one or more pods 424 that each include one or more containers 308. The pods 424 and containers 308 are executed by compute nodes 102 within a cluster 200.

The application bundle 406 itself cannot take any actions, including drawing upon storage resources, communicating with a controller-manager 110, and so forth. The bundle application 606, however, communicates with other components to execute an application using compute resources.

Figure 7:
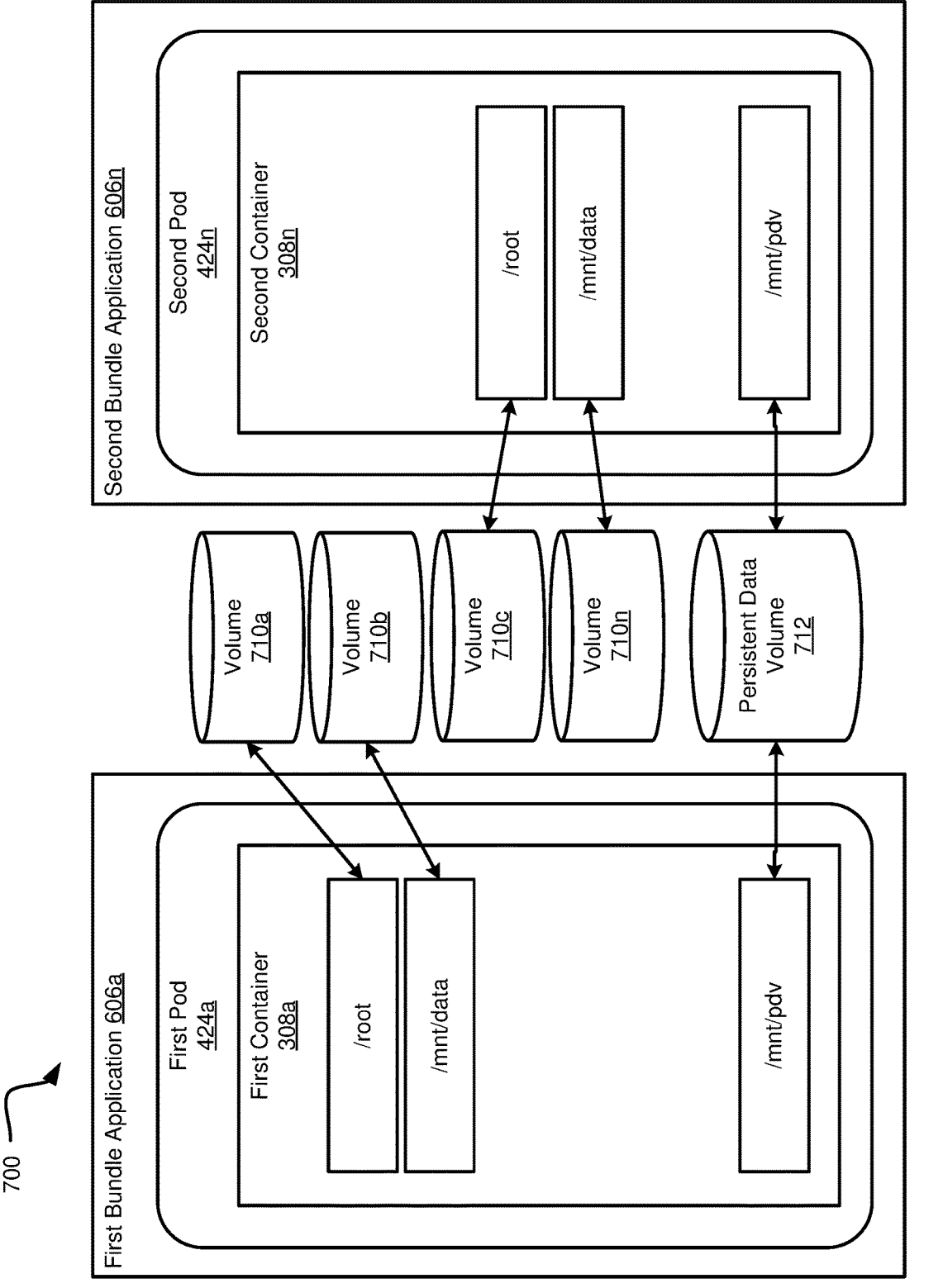
FIG. 7 is a schematic block diagram illustrating an example system for implementing a persistent data volume with each of a first bundle application and a second bundle application.
Figure 8:
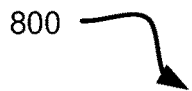
FIG. 8 is a schematic diagram illustrating an abstraction layer scheme for a persistent data volume.

FIGS. 7 and 8 are schematic diagrams illustrating the implementation of persistent data volumes that may be used by multiple applications. FIG. 7 is a schematic diagram of a system 700 for providing persistent data volumes that can be shared across applications. FIG. 8 is a schematic diagram of an abstraction layer scheme 800 comprising persistent data volumes.

The example system 700 illustrated in FIG. 7 includes a first bundle application 606a and a second bundle application 606n, but the system 700 may include any number of applications depending on the implementation. Each bundle application 606 includes a pod 424a, 424n, but it should be understood that the bundle applications 606 may include any number of pods 424 as needed. Further, each bundle application 606 includes a container 308a, 308n, but again, it should be appreciated that the bundle applications 606 may include any number of containers 308 as needed. The bundle applications 606 communicate with volumes 710a, 710b, 710c, 710n (may collectively be referred to as volumes 710 as discussed herein). The applications are further in communication with a persistent data volume 712.

A single pod 424 or container 308 may use any number of volumes 710 simultaneously. Ephemeral volume types have a lifetime of a pod 424, but persistent data volumes 712 exist beyond the lifetime of the pod 424. When a pod 424 ceases to exist, the systems described herein are configured to destroy the ephemeral volumes. However, the persistent data volume 712 will not be destroyed, and for any kind of volume 710 in a given pod 424, the data is preserved across container 308 restarts.

The volumes 710 include directories and files, and are accessible to the containers 308 in a pod 424. Each volume 710 is formatted with a specific type of file system determined by attributes implemented when a user requests the volume 410 from a storage layer. How the directory comes to be, the medium that backs it, and the contents of the volume 710 are determined by the particular volume type used. The volumes 710 essentially serve as a file system including directories and files.

The persistent data volume 712 is created and managed independent of the applications that mount them. A persistent data volume 712 is a piece of storage in the cluster that has been provisioned to have a lifecycle independent of any individual container 308 or pod 424 that uses the persistent data volume 712. A persistent data volume 712 includes a persistent volume claim 814 that is scoped to a namespace and bound to a persistent volume 816.

The abstraction layer scheme 800 illustrated in FIG. 8 indicates that the persistent data volume 712 is managed by a management component 806. The data within the persistent data volume 712 may be supplied to a tenant 802 and/or a user 804. The data within the persistent data volume 712 is for exclusive use by one or more members of a tenant, which may include the owner of the persistent data volume 712 and any users the owner has shared the persistent data volume 712 with.

The persistent data volume 712 serves as an abstraction layer to a deployment system 808 including a persistent volume claim (PVC) 814. The persistent volume claim 814 serves as an abstraction layer to a persistent volume 816. The persistent volume claim 814 is a higher level construct that serves as the volume to the application or bundle application 606. The persistent volume claim 814 maps to a persistent volume 816 that defines and maps to the volume 710. The volume 710 includes actual storage resources allocated by a storage provider 820. The storage provider 820 may include any of a storage node 116, distributed shared storage 114, or stacked storage cluster 118 as discussed herein. How the storage provider 820 constructs the volume 710, including which data blocks are pulled from which disks 818, and so forth, may be beyond the scope of the persistent volume 816 or the persistent volume claim 814. That said, attributes in the persistent volume claim 814 provide a guide to the storage provider 820 regarding the replication factors, media types, and so forth. The storage provider 820 allocates the disk 818 storage resources for the volume 710 and handles Input-Output requests to and from the volume 710 on behalf of the application or bundle application 606.

The persistent volume 816 communicates with a storage provider 820 that includes persistent volume claims 814 supported by a plurality of disk storage resources 818. The persistent data volume 712 essentially acts as a wrapper around a shared storage resource represented by a persistent volume claim 814. The persistent volume claim 814 is itself a wrapper around a persistent volume 816. The persistent volume 816 is a unit of storage within a cluster that was statically provisioned by an administrator or provisioned dynamically by a storage provider 820. The persistent volume 816 represents an actual volume 710 that gets mounted to the host where a pod 424 is deployed.

A persistent volume claim 814 is a request for storage by a user. It is similar to a pod 424, in that it consumes compute and storage node resources. Pods 424 can request specific levels of resources (CPU and memory). Persistent volume claims 814 can request a specific size and access modes, e.g., they can be mounted ReadWriteOnce, ReadOnlyMany, or ReadWriteMany. Cluster administrators need to offer a variety of persistent data volumes 712 that differ in more ways than size and access modes, without exposing users to the details of how those volumes are implemented.

The persistent volume claim 814 for the persistent data volume 712 is created by initiating a call to the API server 108. From the perspective of the application or bundle application 606, the persistent volume claim 814 serves as a higher level construct that functions as the volume itself. The persistent volume claim 814 maps to a persistent volume 816, which in turn maps to a volume 710 provided by the storage provider 820. The volume 710 maps to one or more physical disk 818 storage resources.

FIG. 9 illustrates an example means for mounting a persistent data volume 712 to a pod 424 of a bundle application 606. The persistent data volume 712 is mounted to the pod 424 by adding an entry in a volume listing in a specification for the pod 424. This entry specifies the name of the volume as it will be referenced in the volume mounts section, and the name of an underlying persistent volume claim 814. Then, a volume mounts entry will be added to the specification for each container 308 where the persistent data volume 712 will be mounted. FIG. 9 illustrates an example implementation of this mounting process.

FIG. 10 illustrates an example means for specifying a persistent data volume 712 in an application bundle 406. When adding a persistent data volume 712 to the application bundle 406, the manifest 408 for the application bundle 406 is modified to include a pdvs section to each vnode wherein the persistent data volumes 712 will be mounted (if one does not already exist). Each persistent data volume may include the name of the persistent data volume 712 and its mount path (i.e., its mountpoint).

Persistent volumes 816 can be mounted on a host in any way supported by the resource provider. Persistent volumes 816 may have various access modes, including ReadWriteOnce, ReadOnlyMany, ReadWriteMany, and ReadWriteOncePod. If the persistent volume 816 has ReadWriteOnce access, then the persistent volume 816 can be mounted as read-write by a single node. This mode still allows multiple pods 424 to access the volume when the pods 424 are running on the same node. If the persistent volume 816 has ReadOnlyMany access, then the persistent volume 816 can be mounted as read-only by many nodes. If the persistent volume 816 has ReadWriteMany access, then the persistent volume 816 can be mounted as read-write by many nodes. If the persistent volume 816 has ReadWriteOncePod access, then the persistent volume 816 can be mounted as read-write by a single pod 424. This mode may be used when ensuring that only pod 424 across an entire cluster can read that persistent volume claim 814 or write to it.

Each persistent data volume 712 is bound to a single user for a given namespace. Specifically, the persistent data volume 712 may be bound to the namespace wherein the underlying persistent volume claim 814 is bound. The user 804 must have adequate permissions to create persistent volume claims 814 and deploy applications in the specified namespace.

The persistent data volume 712 may be public or private. Private persistent data volumes 712 may be intended for exclusive use by the persistent data volume's 712 owner when deploying one or more applications. Public persistent data volumes 712 can be shared with one or more users in a tenant 802, or with all tenant users. In some implementations, the public persistent data volume 712 can only be created or owned by a user 804 with administrative capabilities and its ownership cannot be reassigned to a regular user 804.

The persistent data volume 712 simplifies the use of shared persistent volumes 816 when deploying multiple applications in a cluster, and especially when using an application bundle 406 construct. The persistent data volume 712 provides a streamlined mechanism for adding shared data volumes to the application specification.

A persistent data volume 712 that is provisioned and assigned to a user 804 essentially becomes that user's 804 personal storage volume. For example, the user 804 may load a standard dataset into the persistent data volume 712 and then mount the persistent data volume 712 within multiple applications that process the data in a pipeline.

The persistent data volume 712 construct supports the mapping of a persistent data volume 712 to multiple persistent volume claims 814 and persistent volumes 816. This functionality may be enabled by the underlying storage layer, which implements a mechanism for mapping multiple persistent volume claims 814 or persistent volumes 816 to a single volume.

FIG. 11 is a schematic flow chart diagram depicting a method 1100 for mounting a persistent data volume to a bundle application 606. The method 1100 includes generating at 1102 a persistent data volume 712 to be accessed by an application bundle 406, wherein the persistent data volume 712 is created independent of the application bundle 406. The method 1100 includes identifying at 1104 the application bundle 406, wherein the application bundle 406 comprises one or more roles 416, and wherein each of the one or more roles 416 is mapped to a pod 424 comprising one or more containers 308. The method 1100 includes generating at 1106 a persistent volume claim 814 for the persistent data volume 712. The method 1100 includes mounting at 1108 the persistent data volume 712 to at least one of the pods 424 or the containers 308 associated with the at least one of the one or more roles 416 of the application bundle 406.

FIG. 12 is a schematic flow chart diagram depicting a method 1200 for binding a persistent data volume 712 to a user. The method 1200 includes generating at 1202 a persistent data volume 712 to be accessed by one or more applications deployed by a user. The method includes provisioning and assigning at 1204 the persistent data volume 712 to the user such that the persistent data volume 712 serves as a personal storage volume for the user. The method 1200 includes generating at 1206 a persistent volume claim 814 for the persistent data volume 712. The method 1200 includes receiving instructions at 1208 from the user to load a dataset into the persistent data volume 712, and then adding the dataset to the persistent data volume 712. The method 1200 includes mounting at 1210 the persistent data volume 712 to the one or more applications deployed by the user in response to determining that the one or more applications process the dataset.

Figure 13:
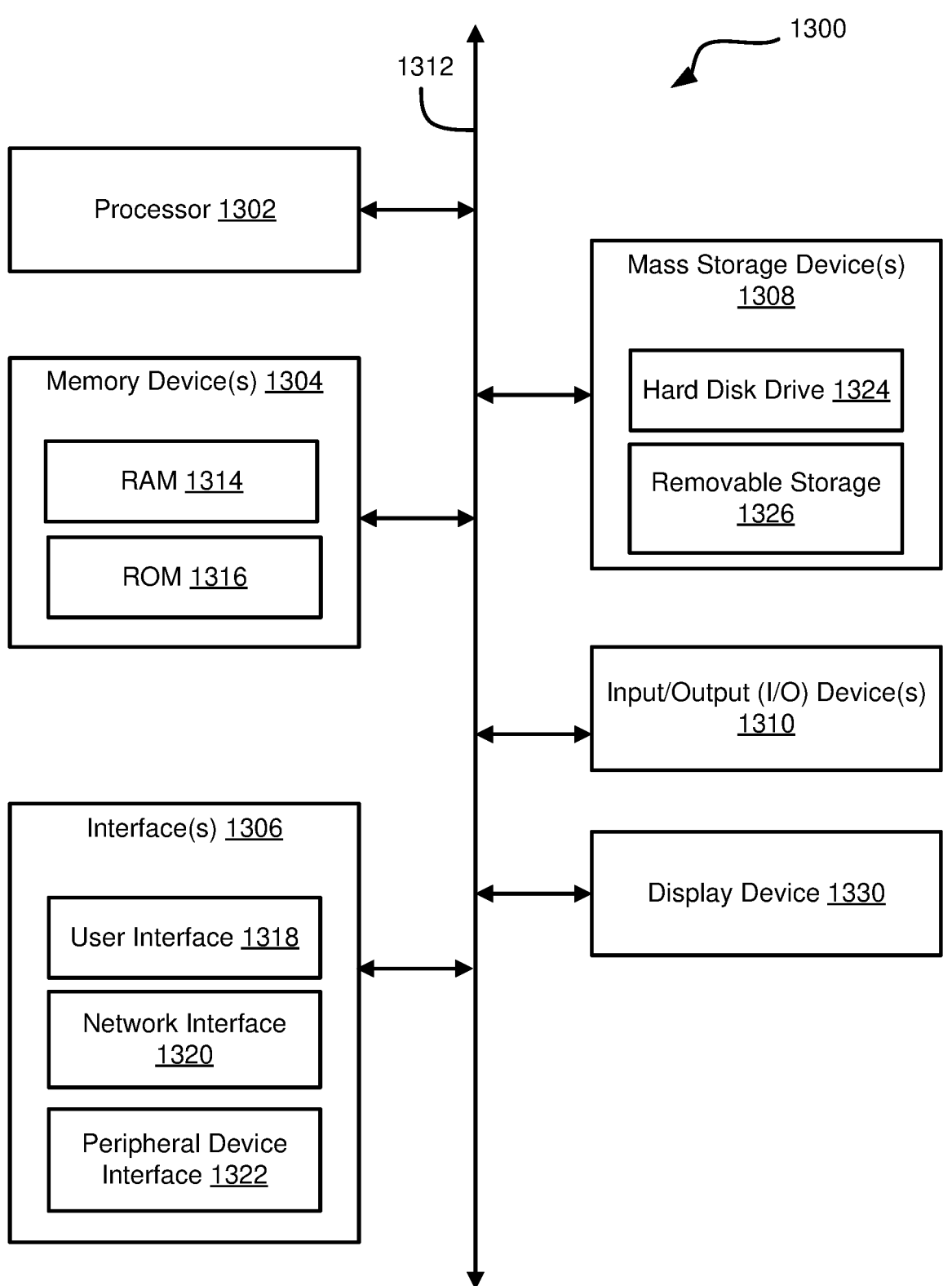
FIG. 13 is a schematic block diagram of an example computing device suitable for implementing methods in accordance with embodiments of the invention.

FIG. 13 illustrates a schematic block diagram of an example computing device 1300. The computing device 1300 may be used to perform various procedures, such as those discussed herein. The computing device 1300 can perform various monitoring functions as discussed herein, and can execute one or more application programs, such as the application programs or functionality described herein. The computing device 1300 can be any of a wide variety of computing devices, such as a desktop computer, in-dash computer, vehicle control system, a notebook computer, a server computer, a handheld computer, tablet computer and the like.

The computing device 1300 includes one or more processor(s) 1304, one or more memory device(s) 1304, one or more interface(s) 1306, one or more mass storage device(s) 1308, one or more Input/output (I/O) device(s) 1310, and a display device 1330 all of which are coupled to a bus 1312. Processor(s) 1304 include one or more processors or controllers that execute instructions stored in memory device(s) 1304 and/or mass storage device(s) 1308. Processor(s) 1304 may also include several types of computer-readable media, such as cache memory.

Memory device(s) 1304 include various computer-readable media, such as volatile memory (e.g., random access memory (RAM) 1314) and/or nonvolatile memory (e.g., read-only memory (ROM) 1316). Memory device(s) 1304 may also include rewritable ROM, such as Flash memory.

Mass storage device(s) 1308 include various computer readable media, such as magnetic tapes, magnetic disks, optical disks, solid-state memory (e.g., Flash memory), and so forth. As shown in FIG. 13, a particular mass storage device 1308 is a hard disk drive 1324. Various drives may also be included in mass storage device(s) 1308 to enable reading from and/or writing to the various computer readable media. Mass storage device(s) 1308 include removable media 1326 and/or non-removable media.

I/O device(s) 1310 include various devices that allow data and/or other information to be input to or retrieved from computing device 1300. Example I/O device(s) 1310 include cursor control devices, keyboards, keypads, microphones, monitors or other display devices, speakers, printers, network interface cards, modems, and the like.

Display device 1330 includes any type of device capable of displaying information to one or more users of computing device 1300. Examples of display device 1330 include a monitor, display terminal, video projection device, and the like.

Interface(s) 1306 include various interfaces that allow computing device 1300 to interact with other systems, devices, or computing environments. Example interface(s)

1306 may include any number of different network interfaces 1320, such as interfaces to local area networks (LANs), wide area networks (WANs), wireless networks, and the Internet. Other interface(s) include user interface 1318 and peripheral device interface 1322. The interface(s) 1306 may also include one or more user interface elements 1318. The interface(s) 1306 may also include one or more peripheral interfaces such as interfaces for printers, pointing devices (mice, track pad, or any suitable user interface now known to those of ordinary skill in the field, or later discovered), keyboards, and the like.

Bus 1312 allows processor(s) 1304, memory device(s) 1304, interface(s) 1306, mass storage device(s) 1308, and I/O device(s) 1310 to communicate with one another, as well as other devices or components coupled to bus 1312. Bus 1312 represents one or more of several types of bus structures, such as a system bus, PCI bus, IEEE bus, USB bus, and so forth.

For purposes of illustration, programs and other executable program components are shown herein as discrete blocks, such as block 302 for example, although it is understood that such programs and components may reside at various times in different storage components of computing device 1300 and are executed by processor(s) 1302. Alternatively, the systems and procedures described herein, including programs or other executable program components, can be implemented in hardware, or a combination of hardware, software, and/or firmware. For example, one or more application specific integrated circuits (ASICs) can be programmed to carry out one or more of the systems and procedures described herein.

EXAMPLES

The following examples pertain to preferred features of further embodiments:

Example 1 is a method. The method includes identifying an application bundle to be executed by one or more compute nodes. The method includes generating a persistent data volume referenced by the application bundle, wherein the persistent data volume is created independent of the application bundle. The method includes mounting the persistent data volume to a bundle application, wherein the bundle application is a deployed application comprising configurations defined by the application bundle. The method includes generating a persistent volume claim for the persistent data volume, wherein the persistent volume claim indicates that the persistent data volume will be retained after a final application referencing the persistent data volume is terminated.

Example 2 is a method as in Example 1, wherein the application bundle comprises one or more pods.

Example 3 is a method as in any of Examples 1-2, wherein each of the one or more pods of the application bundle comprises one or more containers.

Example 4 is a method as in any of Examples 1-3, wherein the container is disposed within the pod.

Example 5 is a method as in any of Examples 1-4, wherein the application bundle comprises a manifest file, and wherein the manifest file includes configuration instructions to allocate a plurality of resources to the application bundle.

Example 6 is a method as in any of Examples 1-5, wherein the application bundle is deployed by one or more compute resources as a bundle application, and wherein the bundle application communicates with a controller manager of a cloud-based network environment.

Example 7 is a method as in any of Examples 1-6, wherein the persistent data volume is stored on disk storage within a distributed shared storage resource.

Example 8 is a method as in any of Examples 1-7, wherein the application bundle comprises a provisioning component.

Example 9 is a method as in any of Examples 1-8, wherein the application bundle includes configuration parameters and functions.

Example 10 is a method as in any of Examples 1-9, wherein the application bundle includes one or more action hooks.

Example 11 is a method as in any of Examples 1-10, wherein the application bundle defines one or more roles, and wherein each of the one or more roles is associated with the same namespace.

Example 12 is a method as in any of Examples 1-11, wherein each role comprises provisioning constraints.

Example 13 is a method as in any of Examples 1-12, wherein each role comprises configuration parameters.

Example 14 is a method as in any of Examples 1-13, wherein each role is associated with a container, and wherein an instance of at least one role of the application bundle is executed by way of the container.

Example 15 is a method as in any of Examples 1-14, wherein generating the persistent volume claim comprises scoping the persistent volume claim to a namespace bound to the persistent data volume.

Example 16 is a method as in any of Examples 1-15, wherein the persistent data volume is managed and created independent of the application bundle.

Example 17 is a method as in any of Examples 1-16, wherein generating the persistent volume claim comprises specifying a storage class that provides binding to the persistent data volume.

Example 18 is a method as in any of Examples 1-17, wherein generating the persistent volume claim comprises defining an access mode for the persistent volume claim, and wherein the access mode is ReadWriteMany if the persistent data volume will be mounted with read-write access.

Example 19 is a method as in any of Examples 1-18, wherein generating the persistent volume claim comprises defining an access mode for the persistent volume claim, and wherein the access mode is ReadOnlyMany if the persistent data volume will be mounted with read only access.

Example 20 is a method as in any of Examples 1-19, wherein generating the persistent volume claim comprises defining a volume reclaim policy as retain such that the persistent data volume will be retained after a final application referencing the persistent data volume is terminated.

Example 21 is a method as in any of Examples 1-20, wherein generating the persistent volume claim comprises defining a namespace where the persistent volume claim will be found, and further defining a size of the persistent data volume.

Example 22 is a method as in any of Examples 1-21, wherein generating the persistent volume claim comprises defining one or more of a media type, replication factor, or fault domain for the persistent data volume.

Example 23 is a method as in any of Examples 1-22, wherein mounting the persistent data volume to the bundle application comprises mounting the persistent data volume to a pod within the bundle application.

Example 24 is a method as in any of Examples 1-23, wherein mounting the persistent data volume to the bundle application comprises adding an entry within a volume list in a specification for the role within the application bundle.

Example 25 is a method as in any of Examples 1-24, wherein mounting the persistent data volume to the bundle application comprises adding volume mount entries in each container of the application bundle where the persistent data volume will be mounted.

Example 26 is a method as in any of Examples 1-25, wherein mounting the persistent data volume to the bundle application comprises modifying a manifest file associated with the application bundle to indicate where the persistent data volume will be mounted.

Example 27 is a method. The method includes identifying an application comprising a role, wherein the role is mapped to a pod comprising one or more containers. The method includes generating a persistent data volume referenced by the application, wherein the persistent data volume is created independent of the application bundle. The method includes generating a persistent volume claim for the persistent data volume. The method includes mounting the persistent data volume to one or more of the pod or the one or more containers.

Example 28 is a method as in Example 27, wherein the application is an application bundle comprising: a manifest file; the role; and a vnode associated with the role, wherein the vnode specifies resources for the role, and wherein the specified resources comprise one or more of memory resources supporting the role, compute resources for executing the role, persistent volumes accessible by the role, persistent data volumes accessible by the role, or ephemeral data volumes accessible by the role.

Example 29 is a method as in any of Examples 27-28, further comprising mounting the persistent data volume to a bundle application, wherein the bundle application is a deployed application comprising configurations defined by the application bundle.

Example 30 is a method as in any of Examples 27-29, wherein the application bundle comprises a plurality of roles, and wherein each of the plurality of roles comprises a vnode, and wherein mounting the persistent data volume to the bundle application comprises: amending the manifest file of the application bundle to identify each vnode where the persistent data volume should be mounted; and identifying a mountpoint where the persistent data volume should be mount to each vnode.

Example 31 is a method as in any of Examples 27-30, wherein the manifest file allocates compute resources for each of one or more containers associated with the application bundle.

Example 32 is a method as in any of Examples 27-31, wherein the application comprises a plurality of roles, and wherein each of the plurality of roles is mapped to a unique pod, and wherein each of the unique pods comprises one or more containers.

Example 33 is a method as in any of Examples 27-32, wherein the persistent data volume provides an abstraction layer to the persistent volume claim, and wherein the persistent volume claim provides an abstraction layer to a persistent volume or volume.

Example 34 is a method as in any of Examples 27-33, wherein the application maps to a namespace associated with a user; wherein the persistent volume claim is bound to the namespace; wherein generating the persistent data volume comprises binding the persistent data volume to the user; and wherein the method further comprises assigning public permissions to the persistent data volume such that one or more of the user or a member of a tenant defined by the user have permissions to access the persistent data volume.

Example 35 is a method as in any of Examples 27-34, wherein the application maps to a namespace associated with a user; wherein the persistent volume claim is bound to the namespace; wherein generating the persistent data volume comprises binding the persistent data volume to the user; and wherein the method further comprises assigning private permissions to the persistent data volume such that the persistent data volume can be utilized by only one user when deploying one or more applications.

Example 36 is a method as in any of Examples 27-35, wherein the application is deployed in association with a cluster comprising: a control plane node; an Application Program Interface (API) server in communication with one or more compute nodes, wherein the API server is executed by the control plane node; a controller manager in communication with the API server, wherein the controller manager is executed by the control plane node; and one or more compute nodes in communication with the control plane node by way of the API server.

Example 37 is a method as in any of Examples 27-36, wherein the persistent data volume provides an abstraction layer to a shared persistent volume that is utilized by a plurality of users when deploying a plurality of applications in a cluster.

Example 38 is a method as in any of Examples 27-37, wherein generating the persistent data volume comprises provisioning and assigning the persistent data volume to a user such that the persistent data volume serves as a personal storage volume for the user when deploying one or more applications.

Example 39 is a method as in any of Examples 27-38, further comprising: receiving instructions from the user to load a dataset into the persistent data volume; adding the dataset to the persistent data volume; and mounting the persistent data volume to one or more applications deployed by the user in response to determining that the one or more applications process the dataset.

Example 40 is a method as in any of Examples 27-39, wherein generating the persistent volume claim comprises specifying an access mode for the persistent volume claim, wherein the access mode comprises one of: ReadWriteMany, wherein the persistent data volume is mounted to the one or more of the pod or the container with read-write access; or ReadOnlyMany, wherein the persistent data volume is mounted to the one or more of the pod or the container with read only access.

Example 41 is a method as in any of Examples 27-40, wherein generating the persistent volume claim comprises defining a volume reclaim policy for the persistent data volume indicating that the persistent data volume will be retained after the one or more of the pod or the container terminates.

Example 42 is a method as in any of Examples 27-41, wherein generating the persistent volume claim comprises binding the persistent volume claim to a namespace.

Example 43 is a method as in any of Examples 27-42, wherein mounting the persistent data volume to the one or more of the pod or the container comprises amending a volume list within a specification for the one or more of the pod or the container to comprise a name of the persistent data volume and a name of the persistent volume claim.

Example 44 is a method as in any of Examples 27-43, wherein mounting the persistent data volume to the one or more of the pod or the container further comprises amending a volume mounts entry within the one or more of the pod or the container to indicate where the persistent data volume will be mounted.

Example 45 is a method as in any of Examples 27-44, wherein the application is an bundle application, and wherein the method further comprises mounting the persistent data volume to the bundle application.

Example 46 is a method as in any of Examples 27-45, further comprising mapping the persistent data volume to a plurality of persistent volume claims.

It will be appreciated that various features disclosed herein provide significant advantages and advancements in the art. The following claims are exemplary of some of those features.

In the foregoing Detailed Description of the Disclosure, various features of the disclosure are grouped together in a single embodiment for the purpose of streamlining the disclosure. This method of disclosure is not to be interpreted as reflecting an intention that the claimed disclosure requires more features than are expressly recited in each claim. Rather, inventive aspects lie in less than all features of a single foregoing disclosed embodiment.

It is to be understood that any features of the above-described arrangements, examples, and embodiments may be combined in a single embodiment comprising a combination of features taken from any of the disclosed arrangements, examples, and embodiments.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements.

Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

Further, where appropriate, functions described herein can be performed in one or more of: hardware, software, firmware, digital components, or analog components. For example, one or more application specific integrated circuits (ASICs) or field programmable gate arrays (FPGAs) can be programmed to carry out one or more of the systems and procedures described herein. Certain terms are used throughout the following description and claims to refer to particular system components. As one skilled in the art will appreciate, components may be referred to by different names. This document does not intend to distinguish between components that differ in name, but not function.

The foregoing description has been presented for the purposes of illustration and description. It is not intended to be exhaustive or to limit the disclosure to the precise form disclosed. Many modifications and variations are possible in light of the above teaching. Further, it should be noted that any or all the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method comprising:
identifying an application bundle comprising a role, wherein the role is mapped to a pod comprising a container;
generating a persistent data volume referenced by the application bundle, wherein the persistent data volume is created independent of the application bundle;
generating a persistent volume claim for the persistent data volume; and
mounting the persistent data volume to one or more of the pod or the container;
wherein:
the application bundle maps to a namespace associated with a user; and
the persistent volume claim is bound to the namespace;
wherein generating the persistent data volume comprises binding the persistent data volume to the user; and
wherein the method further comprises assigning private or public permissions to the persistent data volume, wherein:
the private permissions indicate that only the user has permissions to access the persistent data volume; and
the public permissions indicate that the persistent data volume can be utilized by the user or a member of a bound tenant having permission to access the persistent data volume.

2. The method of claim 1, wherein the application bundle comprises:
a manifest file;
the role; and
a vnode associated with the role, wherein the vnode specifies resources for the role, and wherein the specified resources comprise one or more of memory resources supporting the role, compute resources for executing the role, persistent volumes accessible by the role, persistent data volumes accessible by the role, or ephemeral data volumes accessible by the role.

3. The method of claim 2, further comprising mounting the persistent data volume to a bundle application, wherein the bundle application is a deployed application comprising configurations defined by the application bundle.

4. The method of claim 3, wherein the application bundle comprises a plurality of roles, and wherein each of the plurality of roles comprises a vnode, and wherein mounting the persistent data volume to the bundle application comprises:
amending the manifest file of the application bundle to identify each vnode where the persistent data volume should be mounted; and
identifying a mountpoint where the persistent data volume should be mounted to each vnode.

5. The method of claim 1, wherein the application bundle comprises a plurality of roles, and wherein each of the plurality of roles is mapped to a unique pod, and wherein each of the unique pods comprises one or more containers.

6. The method of claim 1, wherein the persistent data volume provides an abstraction layer to the persistent volume claim, and wherein the persistent volume claim provides an abstraction layer to one or more of a persistent volume or a volume associated with the application bundle.

7. The method of claim 1, wherein the application bundle is deployed to generate a bundle application, and wherein the bundle application is deployed in association with a cluster comprising:

a control plane node;

an Application Program Interface (API) server in communication with one or more compute nodes, wherein the API server is executed by the control plane node;

a controller manager in communication with the API server, wherein the controller manager is executed by the control plane node; and the one or more compute nodes in communication with the control plane node by way of the API server.

8. The method of claim 1, wherein generating the persistent data volume comprises provisioning and assigning the persistent data volume to the user such that the persistent data volume serves as a personal storage volume for the user when deploying one or more applications.

9. The method of claim 1, further comprising:

receiving instructions from the user to load a dataset into the persistent data volume;

adding the dataset to the persistent data volume; and mounting the persistent data volume to one or more applications deployed by the user in response to determining that the one or more applications process the dataset.

10. The method of claim 1, wherein generating the persistent volume claim comprises specifying an access mode for the persistent volume claim, and wherein the access mode comprises one of:

ReadWriteMany, wherein the persistent data volume is mounted to the one or more of the pod or the container with read-write access; or ReadOnlyMany, wherein the persistent data volume is mounted to the one or more of the pod or the container with read only access.

11. The method of claim 1, wherein generating the persistent volume claim comprises defining a volume reclaim policy for the persistent data volume indicating that the persistent data volume will be retained after termination of all pods or containers that access the persistent data volume.

12. The method of claim 1, wherein mounting the persistent data volume to the one or more of the pod or the container comprises:

amending a volume list within a specification for the one or more of the pod or the container to comprise a name of the persistent data volume and a name of the persistent volume claim; and amending a volume mounts entry within the one or more of the pod or the container to indicate where the persistent data volume will be mounted.

13. A system comprising one or more processors configured to execute instructions stored in non-transitory computer readable storage medium, the instructions comprising:

identifying an application bundle comprising a role, wherein the role is mapped to a pod comprising a container;

generating a persistent data volume referenced by the application bundle, wherein the persistent data volume is created independent of the application bundle;

generating a persistent volume claim for the persistent data volume; and mounting the persistent data volume to one or more of the pod or the container;

wherein:

the application bundle maps to a namespace associated with a user; and the persistent volume claim is bound to the namespace;

wherein generating the persistent data volume comprises binding the persistent data volume to the user; and wherein the system is further configured to assign private or public permissions to the persistent data volume, wherein:

the private permissions indicate that only the user has permissions to access the persistent data volume; and the public permissions indicate that the persistent data volume can be utilized by the user or a member of a bound tenant having permission to access the persistent data volume.

14. The system of claim 13, wherein the application bundle comprises:

a manifest file;

the role; and a vnode associated with the role, wherein the vnode specifies resources for the role, and wherein the specified resources comprise one or more of memory resources supporting the role, compute resources for executing the role, persistent volumes accessible by the role, persistent data volumes accessible by the role, or ephemeral data volumes accessible by the role.

15. The system of claim 13, wherein the application bundle comprises a manifest file and a plurality of roles, and wherein each of the plurality of roles comprises a vnode, and wherein the instructions are such that mounting the persistent data volume to the one or more of the pod or the container comprises:

amending the manifest file of the application bundle to identify each vnode where the persistent data volume should be mounted; and identifying a mountpoint where the persistent data volume should be mounted to each vnode.

16. The system of claim 13, wherein the application bundle comprises a plurality of roles, and wherein each of the plurality of roles is mapped to a unique pod, and wherein each of the unique pods comprises one or more containers.

17. The system of claim 13, wherein the application bundle is deployed to generate a bundle application, and wherein the bundle application is deployed in association with a cluster comprising:

a control plane node;

an Application Program Interface (API) server in communication with one or more compute nodes, wherein the API server is executed by the control plane node;

a controller manager in communication with the API server, wherein the controller manager is executed by the control plane node; and the one or more compute nodes in communication with the control plane node by way of the API server.

18. The system of claim 13, wherein the instructions are such that generating the persistent data volume comprises provisioning and assigning the persistent data volume to the user such that the persistent data volume serves as a personal storage volume for the user when deploying one or more applications.

* * * * *